United States Patent [19]

Jablonsky

[11] 4,028,998

[45] June 14, 1977

[54] AUXILIARY POWER STEERING GEAR FOR MOTOR VEHICLES HAVING A COMMON HYDRAULIC SYSTEM

[75] Inventor: Erich Jablonsky, Bobingen, Germany

[73] Assignee: Zahnradfabrik Friedrichshafen AG, Germany

[22] Filed: Dec. 2, 1975

[21] Appl. No.: 637,072

[52] U.S. Cl. .................................. 92/107; 92/136; 92/167; 91/375 A

[51] Int. Cl.² .......................... F01B 9/00; F15B 9/10

[58] Field of Search ............ 91/375 A, 375 R, 380; 92/108, 107, 165, 167, 136

[56] References Cited

UNITED STATES PATENTS

| | | | |
|---|---|---|---|
| 3,291,002 | 12/1966 | Folkerts | 91/375 A |
| 3,667,346 | 6/1972 | Duffy | 91/375 A |
| 3,896,702 | 7/1975 | Shah et al. | 91/375 A |
| 3,896,703 | 7/1975 | Bertanza | 91/375 A |
| 3,927,604 | 12/1975 | Jablonsky | 91/375 R |

Primary Examiner—Paul E. Maslousky
Attorney, Agent, or Firm—Zalkind & Shuster

[57] ABSTRACT

A double acting power boost cylinder comprising a movable servo piston for vehicle steering purposes is provided with means comprising a fixed piston protruding into a bore of the servo piston so as to reduce the effective end surface pressure receiving areas of the servo piston. Thus, the total forces acting to drive the servo piston are reduced to avoid overload or damage to a steering mechanism driven by the servo power piston. The invention has its utility in vehicles where a common hydraulic source is used for various purposes such as steering, brakes, vehicle level and the like where pressures required may vary and where the pressure required for steering is not as great as required for other purposes. Usually accumulators are used and the invention is of particular utility since it permits the use of small pumping devices. In particular, however, the conventional booster steering gear arrangements comprising double acting power cylinders have dimensions and diameters determined by the geometry of gear sectors, within the housing, engaging rack teeth cut into the surface of the servo piston, as well as various other mechanical parts in the housing. Accordingly, the invention permits the reduction in the overall driving force of the servo piston without need for redesign of the overall dimensions of a conventional double acting cylinder arrangement.

3 Claims, 3 Drawing Figures

AUXILIARY POWER STEERING GEAR FOR MOTOR VEHICLES HAVING A COMMON HYDRAULIC SYSTEM

It will be recognized as obvious that where a reduction of driving force of a piston is desired for a fixed value of pressure acting thereon, a smaller piston could be used. That, however, would bring about, for the present purposes, a complex arrangement inasmuch as various driving elements such as a gear sector and stub shaft to which it is secured to drive a steering mechanism must have a certain fairly large size for strength and reliable operation. Therefore, a redesign of such a double acting cylinder housing to provide a reduced driving force would result in a cylinder of extended length thereby introducing problems of redesign of spacing for accomodating the cylinder. Accordingly, the invention by using a conventional size of all mechanical drive components introduces no space or dimension problems but does solve the problem of overloaded steering linkage components. The invention further compensates for the normally high pressure accumulators met in practice where vehicles use common hydraulic systems.

The construction is, for the most part, of generally conventional arrangement, incorporated by reference being made as to U.S. Pat. No. 3,832,933, issued Sept. 3, 1974, U.S. Pat. No. 3,855,904, issued Dec. 24, 1974 and U.S. Pat. No. 3,896,703, issued July 29, 1975 showing a ball nut provided internally of a power boost servo piston having rack teeth cut into a side surface where the depth of the teeth is a factor that determines the inside diameter of the steering housing of such devices and thus determines an overall diameter of piston which would normally be too large considering the high pressures to which it would be subjected in systems of the kind described.

Thus, by providing a reduction in effective area of the ends of the double acting movable servo piston in a manner to be specifically described, the overall drive force exerted by the piston via the gear rack and sector is reduced to a saft degree.

A detailed description of the invention now follows: in conjunction with the appended drawing, in which.

Figure 1:
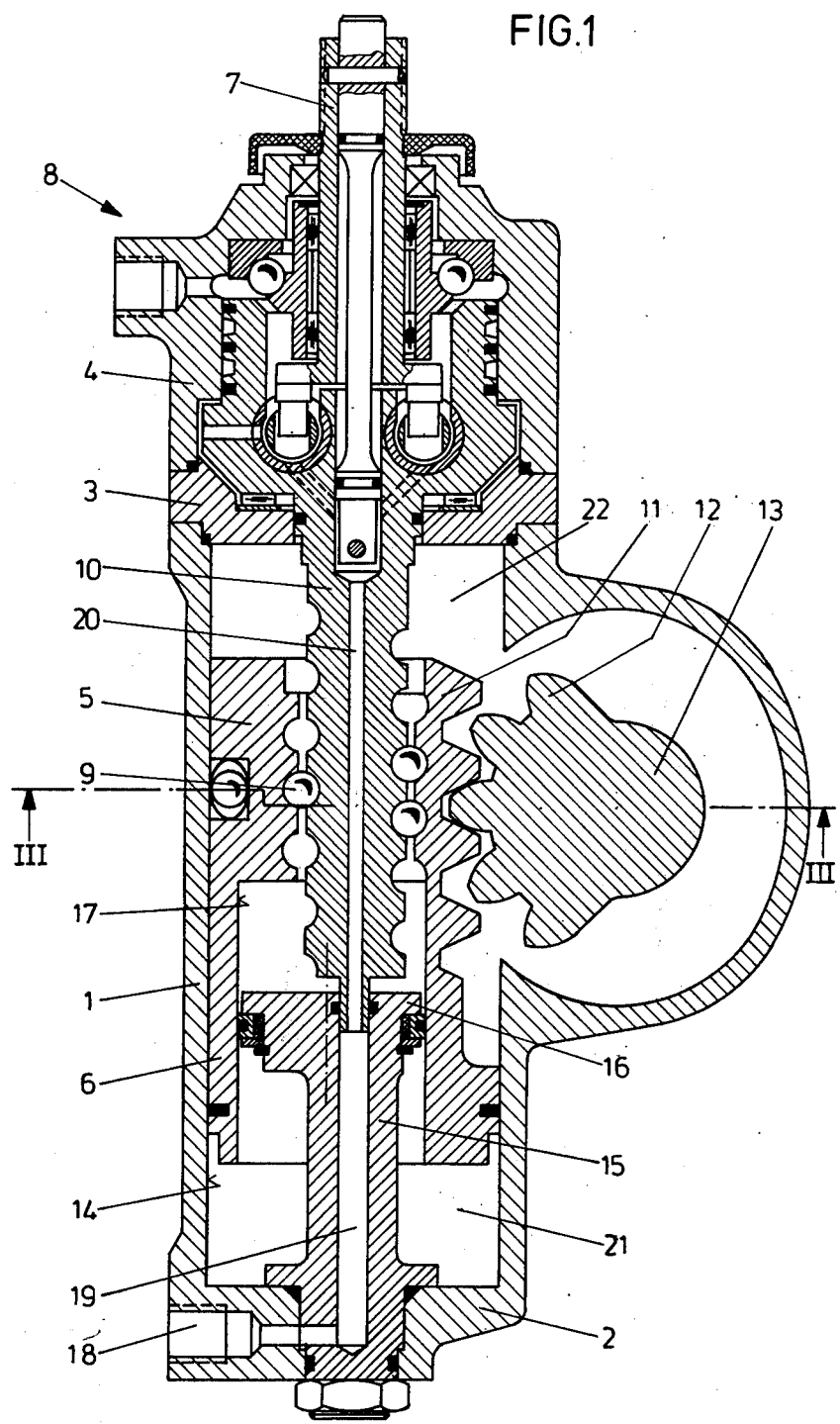
FIG. 1 is a longitudinal cross-section showing essential components of the invention.

Referring to the drawing, a steering gear housing 1 is disclosed which comprises a power boost or servo cylinder 14 having an integral end wall 2 which effects a closure and being closed at the top by a sealed flange 3 on which rests a collar 4 housing conventional valving 8 in a manner well understood by persons skilled in the art. Within the cylinder is a reciprocal power boost or servo piston 6 having a portion effecting ball nut 5 in driving coaction via balls 9 with a steering worm 10 rotatable in a known manner by steering spindle 7. For known details of valving and passages see aforementioned U.S. Pat. Nos. 3,832,933; 3,855,904 and 3,896,703.

Machined into the side of the piston 6 are the usual rack teeth 11 engaging teeth 12 of a gear sector integral with the usual stub or steering shaft 13 which will be understood to actuate a steering mechanism (not shown).

As heretofore discussed, the inside diameter of the double acting cylinder 14 having pressure chambers 21 and 22 is determined by the need for a particular size of ball nut arrangement and gearing, all contained within the housing 4. Nevertheless, despite the large size of the components, especially piston 6, a reduced pressure force acting on the ends of the piston 6 can be achieved by a fixed piston 16 carried on a collar 15 secured to the end wall 2 of the housing as shown. Piston 16 is sealingly and slidingly arranged in end bore 17 of piston 6 and has opposed faces which immovably are portions of the respective surfaces of the movable piston 6 which receive driving force when respective chambers are pressurized.

Figure 2:
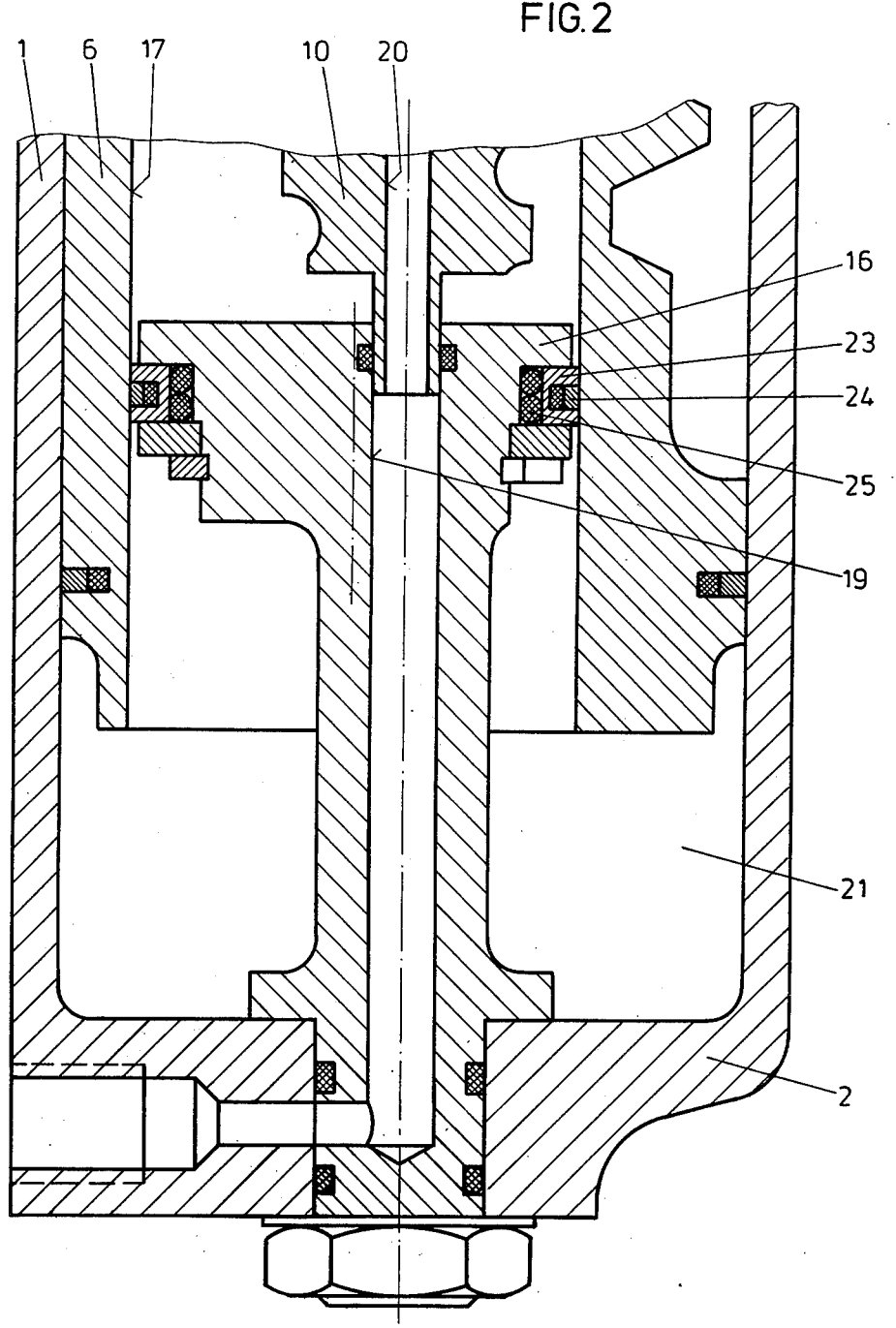
FIG. 2 is an enlarged fragmentary cross-section of the particular cmponents of the invention.
Figure 3:
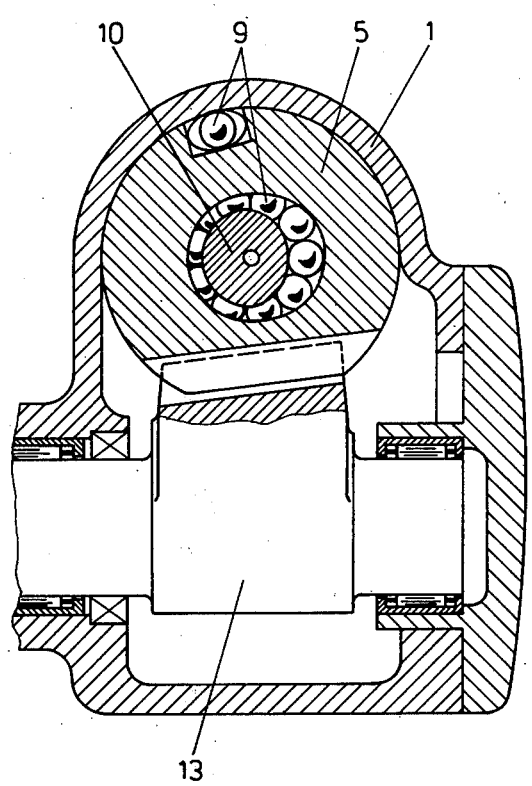
FIG. 3 is a section through III—III of FIG. 1.

The axis of fixed piston 16 is offset from the axis of movable piston 6 in a direction away from the side of the piston on which the rack teeth are cut as indicated by the phantom line in FIG. 2. By so doing, it will be apparent that larger end surfaces of piston 16 are thus provided then would otherwise be possible as will be obvious from the geometry of the components. In other words, were the axis of piston 16 coaxial with the axis of movable piston 6, it is apparent that the diameter of fixed piston 16 would necessarily be considerably smaller. The offset axis of piston 16 provides relative eccentricity of the two pistons.

Due to the disposition of piston 16 in bore 17, and the fact that piston 16 is a fixed piston, any pressure in chamber 21 via a pressure feed means such as port 18 would necessarily act only on the respective end surface area of piston 6 which is the difference between the overall diameter of that piston and the diameter of piston 16. Accordingly, a reduced overall pressure force on movable piston 6 is effected in upward movement as viewed on FIG. 1. For the same reasons the lower end surface area of piston 6 exposed to fluid pressure in chamber 22 is likewise reduced in effective area, viz., the difference between the respective overall area of piston 6 and the area of piston 16.

In order to provide fluid flow from port 18 it communicates with a passage 19 through collar 15 which communicates with passage 20 axially disposed in the steering worm 10. It will be understood that such pressure feed is controlled via the valving 8 so as to pressurize and exhaust selectively the pressure chambers 21 and 22 in a well understood manner.

In order to provide a sliding seal and avoid the need for structural bracing between piston 6 and 16 and steering worm 10, double guidance is provided by piston 16. Thus, an axial non-shifting piston ring means having annular channel 23 is provided with a frictionless ring elements 24 so that the servo piston 6 may slide readily within the housing and relative to fixed piston 16. Further, gasket elements such as O-rings 25 of compressible material are interposed between the channel 23 and piston 16 to permit a certain amount of radial play in order to effect proper seal with minimum friction by permitting the piston ring channel 23 and rings 24 to center within the bore 17.

Accordingly, from the above description it will be apparent that the invention permits reduced drive force use of existing power booster steering housings and other components found therein in high pressure systems by the single expedient of providing a fixed position insert. Thus, there is avoided any need for changes in dimensions, particularly overall length of the housing which would otherwise by necessary for a servo piston specially designed to have a solid end surface of reduced diameter.

What is claimed is:

1. In an auxiliary power steering servomotor:
    a housing (1) having a double acting pressure cylinder comprising pressure chambers (21, 22) and a movable piston (6) in said cylinder having opposite end surfaces in respective pressure chambers and being reciprocally movable by pressurization of respective chambers;
    steering mechanism drive means comprising a gear rack (11) on said movable piston and a gear sector (12) supported in said housing to drive a steering mechanism responsive to movement of said movable piston;
    a bore (17) in said movable piston, and said housing carrying a fixed piston (15) extending slidably into and terminating within said movable piston bore and seal means on said fixed piston for effecting a continuous seal with said bore between said pressure chambers;
    said fixed piston having opposed faces of areas predetermined relative to respective opposite end surfaces of said movable piston to reduce the effective pressurized areas thereof for reduction of the effective drive force of said movable piston to a predetermined degree required to operate the steering mechanism;
    said fixed piston being constructed and arranged so that the respective effective area of each end surface of said movable piston is determined by the difference between respective diameters of said movable and fixed pistons for predetermining the pressure force exerted by said movable piston on said steering mechanism to maintain said predetermined reduced driving force exerted by said movable piston on said steering mechanism when either chamber is pressurized;
    said bore in said movable piston having an axis offset from the axis of said movable piston in a direction away from said gear rack to effect increased end surface areas for said fixed piston.

2. In a servomotor as set forth in claim 1, said seal means comprising a piston ring means (23, 24) carried by said fixed piston engaging the bore in said movable piston and a compressible ring means (25) intermediate said piston ring means and said fixed piston to permit radial play of said fixed piston in said bore.

3. In a servomotor as set forth in claim 1, said steering mechanism drive means comprising a steering worm extending into said movable piston and concentric therewith and being eccentric to said bore and terminating therein.

* * * * *